March 9, 1965 T. P. GOODMAN 3,172,630
FORCE CANCELLING BEARING PEDESTALS USING RECIPROCATING MASSES
Filed May 14, 1962 3 Sheets-Sheet 1

Inventor:
Thomas P. Goodman,
by Paul A. Frank
His Attorney.

Inventor:
Thomas P. Goodman,
by Paul G. Frank
His Attorney.

March 9, 1965     T. P. GOODMAN     3,172,630
FORCE CANCELLING BEARING PEDESTALS USING RECIPROCATING MASSES
Filed May 14, 1962     3 Sheets-Sheet 3

Inventor:
Thomas P. Goodman,
by Paul A. Frank
His Attorney

United States Patent Office 3,172,630
Patented Mar. 9, 1965

3,172,630
FORCE CANCELLING BEARING PEDESTALS
USING RECIPROCATING MASSES
Thomas P. Goodman, Schenectady, N.Y., assignor to
General Electric Company, a corporation of New York
Filed May 14, 1962, Ser. No. 194,585
5 Claims. (Cl. 248—20)

This invention relates to vibration reducing apparatus and, more specifically, to a means for neutralizing the unbalance forces of a rotating shaft at the shaft bearing pedestal.

During the manufacture and assembly of rotating machinery, every reasonable effort is made to insure that the rotating parts are in balance. However, such efforts do not always result in perfect balance of the rotating parts. One reason is that unbalance forces obtained during actual operation may be greater, or of a different nature, than those measured before installation of the equipment in its operational location. This may be due to an inability to precisely simulate operational location environment during balance testing prior to installation. Moreover, even if essentially perfect balancing has been achieved prior to installation, unbalance forces may change after installation due to such causes as wear of the rotating parts and accumulation of foreign matter upon the rotating parts. Also, a flexible rotor that is perfectly balanced at one operating speed will not, in general, be perfectly balanced at a different operating speed. For these reasons, it is desirable to have an unbalance force neutralizing means which can be adjusted to compensate for changing unbalance conditions as these conditions vary with time. The unbalance forces may vary with regard to magnitude; i.e., the unbalance remains at the same location on the rotating part but increases or decreases in magnitude. This could be the result of accumulation or attrition of foreign matter at that location. The unbalance forces may also vary with regard to phase; i.e., the point of resultant unbalance may move with regard to a reference point on the rotating part. This latter variance could be the result of wear of the rotating parts which would shift the center of gravity. The ideal arrangement, therefore, would be one capable of adjustment to compensate for either or both of these changing conditions; i.e., magnitude and phase.

In addition to the problem of a single unbalance force varying in magnitude and phase, a rotating machine quite often experiences a plurality of periodic forces occurring at the same time but having different frequencies. It would, therefore, be desirable to have an arrangement capable of the aforementioned adjustments relating to magnitude and phase but, as well, capable of neutralizing a plurality of contemporary periodic forces of different frequencies.

It is, therefore, an object of this invention to provide a means to continuously neutralize the unbalance forces of a rotating element as both the magnitude and phase of such forces change with time.

It is also an object of this invention to provide a means to continuously neutralize a plurality of contemporaneous periodic forces, having different frequencies, of a rotating member as both the magnitude and phase of the individual forces change with time.

It is a further object of this invention to provide manual or automatic control means for adjusting an unbalance force neutralizer for a rotating element to compensate for changes in the magnitude and phase of the unbalance forces with time.

Briefly stated, in accordance with one aspect of the invention, a bearing pedestal is provided to support the rotating shaft whose unbalance forces are to be neutralized. First and second weights are mounted on the pedestal for reciprocating movement relative thereto and drive means are provided to cause a more or less continuous reciprocating movement of the weights to neutralize undesired unbalance forces. A synchro transmitter is mechanically linked to the shaft and is adapted to generate a signal in response to the rotation of the shaft. A synchro receiver is electrically connected to the synchro transmitter to rotate a second shaft in response to the signal generated by the synchro transmitter. The synchro receiver is manually adjustable to compensate for any change in the phase of the unbalance force of the rotating shaft. First and second resolvers are mechanically linked to the second shaft to generate two voltages which are functions of the rotational position of the first shaft, the phase angle of the unbalance force, and the angle which the line of travel of the respective weights makes with a vertical line passing through the center line of the first shaft. A first manually-adjustable attenuator is provided to receive the signal generated by the first resolver and to modify the magnitude of that signal. A first control means controls the operation of the first weight drive means in response to the signal generated by the first resolver as modified by the first attenuator. A second manually-adjustable attenuator is provided to modify the magnitude of the signal generated by the second resolver and a second control means is provided to control the operation of the second weight drive means in response to the signal generated by the second resolver as modified by the second attenuator.

While the specification concludes with claims particularly pointing out and distinctly claiming the subject matter which is regarded as the invention, the invention will be better understood from the following description taken in connection with the accompanying drawings, in which:

Figure 1:
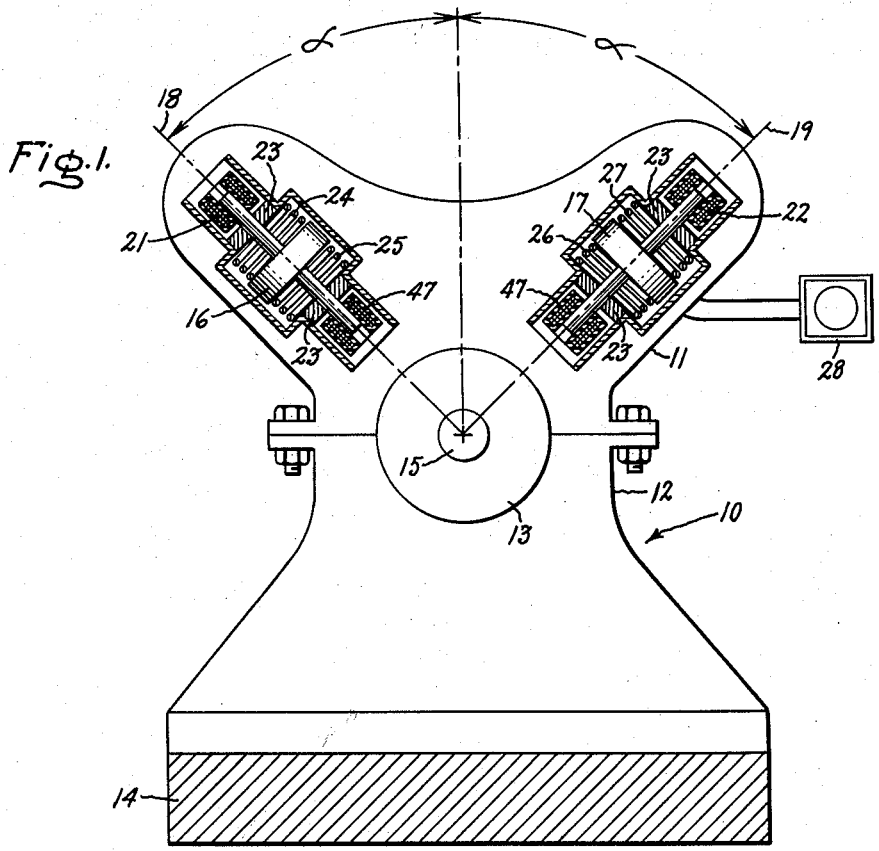
FIGURE 1 is an elevational view of the mechanical arrangement of the invention showing the relative locations of the reciprocating weights, bearing pedestal and rotating shaft.

Referring to the drawings, and in particular to FIGURE 1, there is shown a bearing pedestal 10 having an upper portion 11 and a lower portion 12 secured to each other and supporting a shaft bearing 13. The lower portion 12 is secured to a structural member such as bed plate 14. The shaft bearing 13 supports a rotating shaft 15 which in turn carries rotating machinery, the nature of which is not critical to the subject invention. This rotating machinery may not be in perfect balance and, if such is the case, the unbalance will result in a force being applied to the bearing pedestal 10 in the form of a rotating force vector which will set up a vibration transmitted from the bearing pedestal 10 to the bed plate 14 and having a frequency which is a function of the rotational speed of the shaft 15.

Since, in many circumstances, the transmission of this vibrational force to the bed plate 14 is undesirable, means are provided to neutralize this vibrational force in the bearing pedestal 10 so that it is prevented from reaching the bed plate 14. In accordance with the invention, reciprocating weights 16 and 17 are carried by the upper portion 11 of the bearing pedestal 10 in a manner so that they are free for reciprocating motion along the lines 18 and 19, respectively. The exact operation and function of the reciprocating weights 16 and 17 will be more fully discussed hereinafter. However, it may be well to point out at this time that, in one embodiment shown in FIGURES 1 and 5, a solenoid means or electromagnetic coil 21 is provided to cause the reciprocating movement of the weight 16 and an electromagnetic coil 22 is provided to cause reciprocating movement of the weight 17. Bearings 23 may be provided to insure linear movement of the weight 16 and the weight 17. Springs 24 and 25 are provided to return the weight 16 to the neutral position, as shown in FIGURE 1, when the electromagnetic coil 21 is deenergized and to cushion any overtravel of weight 16. Return springs 26 and 27 are provided to perform similar functions for the weight 17. Other embodiments could employ hydraulic or pneumatic drive means for the weights 16 and 17.

In order to provide a better understanding of the invention, the following mathematical relationships between the unbalance forces and the neutralizing reciprocating masses are given. The resultant unbalance force generated by a rotating element can be expressed as follows:

where $F_r = MRw^2$
$M$ = resultant shaft unbalance (slugs)
$R$ = radius of $M$ from shaft center (feet)
$w$ = speed of shaft (radians per second), and
$F_r$ = resultant unbalance force (lbs.)

Figure 4:
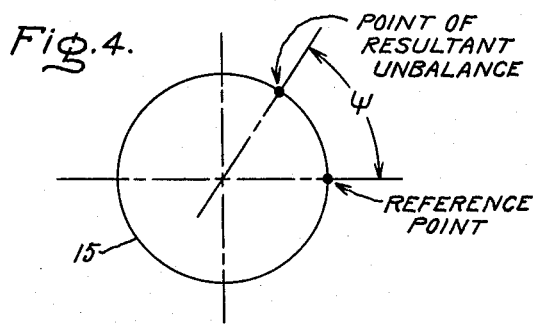
FIGURE 4 is a schematic representation of a rotating shaft and illustrates the phase angle.

This expression can be resolved into horizontal and vertical unbalance forces which could be expressed as follows:

where $F_h = MRw^2 \cos(wt+\psi)$
$F_v = MRw^2 \sin(wt+\psi)$
$F_h$ = horizontal unbalance force
$F_v$ = vertical unbalance force
$t$ = time, and
$\psi$ = the phase angle between the point of resultant unbalance and any reference point on the rotating member (see FIGURE 4).

In view of the above mathematical relationships, the following relationships may be resolved:

$$X_1 = \frac{MR}{m_1 \sin 2\alpha} \cos(wt+\psi+\alpha)$$

where $$X_2 = \frac{-MR}{m_2 \sin 2\alpha} \cos(wt+\psi-\alpha)$$

$X_1$ = the distance the first weight must travel along its own axis to provide a reactive force which, in conjunction with the reactive force of the second weight, will cancel the resultant unbalance force
$X_2$ = the distance that the second weight must travel to cancel the resultant unbalance force
$m_1$ = the mass of the first weight
$m_2$ = the mass of the second weight, and
$\psi$ = the angle that the line of travel of either weight makes with a vertical line through the center of the rotating shaft (see FIGURE 1).

In order to determine the condition of unbalance force transmitted to the bearing pedestal 10, suitable probes and indicating equipment 28 may be provided and would preferably be associated with the bearing pedestal 10 without affecting the vibratory motion thereof. These probes may be of the type commonly known as accelerometers, velocity pickups, or proximity gages which are electric type gages that do not interfere with the rotor movement. If desired, optical type pickups may be employed. In the preferred embodiment, an apparatus, such as disclosed in my co-pending application entitled "Vibration Vector Measurement and Display Apparatus," Serial No. 194,586, filed May 14, 1962, may be used to determine the condition of unbalance.

Figure 2:
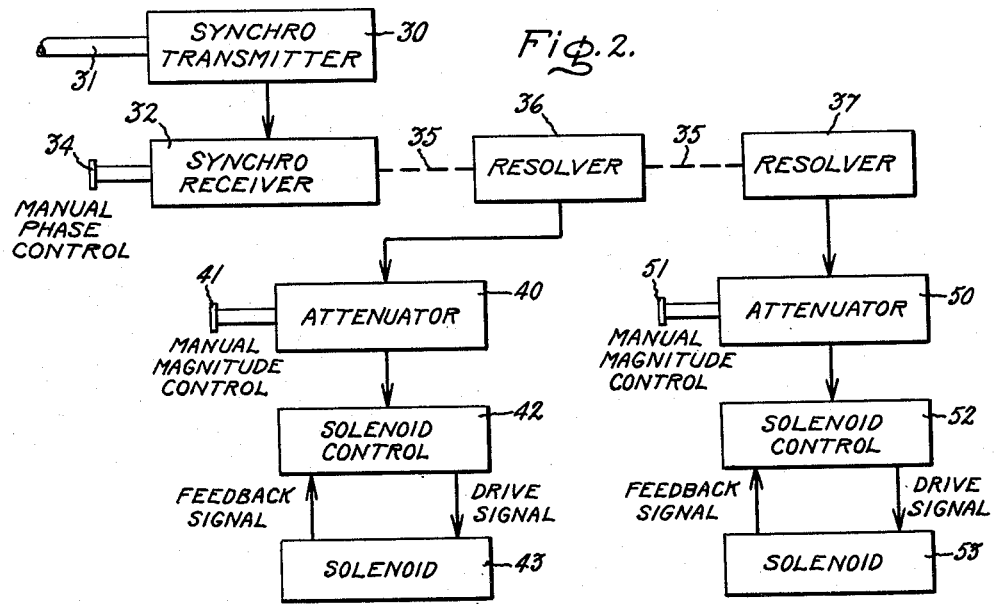
FIGURE 2 is a block diagram illustrating the electrical control system of one embodiment of the invention.

Referring now to FIGURE 2, there is illustrated a block diagram representing a control circuit which enables an operator viewing the indicating equipment 28 to achieve a weight travel prescribed by the aforementioned equations. A synchro transmitter 30 is driven by shaft 31 which rotates in response to the rotation of the shaft 15. The synchro transmitter 30 generates a signal which is a function of the amount of rotation of shaft 31 and which, therefore, can be represented as a function of $wt$. The signal thus generated by the synchro transmitter 30 is transmitted to a synchro receiver 32 which has a manually rotatable stator which may be adjusted by the manual phase control 34. By rotating the stator, the operator can advance or retard the relative rotational position of the synchro shaft 35 with respect to shaft 31. The manual phase control 34 provides a means for compensating for any phase angle which may exist between a reference point on the rotating shaft and the point of resultant unbalance. This relationship is illustrated in FIGURE 4 wherein the angle $\psi$ represents the phase angle. This angle may be determined by the indicating equipment 28.

The synchro receiver 32 drives a shaft 35 in response to the signal received from the synchro transmitter 30 with the added phase angle as prescribed by the manual phase control 34. In other words, the rotary movement of shaft 35 may be expressed as a function of $(wt+\psi)$. The shaft 35 is mechanically linked to a first resolver 36 and a second resolver 37 which are driven thereby. It should be still noted that the invention would be equally operable if the synchro transmitter and synchro receiver were omitted, and the shaft 35 were mechanically linked to shaft 15. The phase adjustment could then be obtained by differential gearing.

The resolvers 36 and 37 may be of the design disclosed by C. J. Savant, Jr., Basic Feedback Control System Design, McGraw-Hill, 1958, pages 249–252. The first resolver 36 generates a voltage signal in response to the position of shaft 35 which may be expressed as follows:

$$e_r = \cos(wt+\psi+\alpha)$$

This signal is transmitted to an attenuator 40 which has a manually adjustable magnitude or amplitude control 41 extending therefrom. The attenuator 40 modifies the signal generated by resolver 36 so that the signal leaving the attenuator 40 becomes representative of the distance that the first weight 16 must travel to generate the appropriate neutralizing force. This signal may be expressed as follows:

$$e_a = \frac{M}{m_1 \sin 2\alpha} \cos(wt+\psi+\alpha)$$

Figure 5:
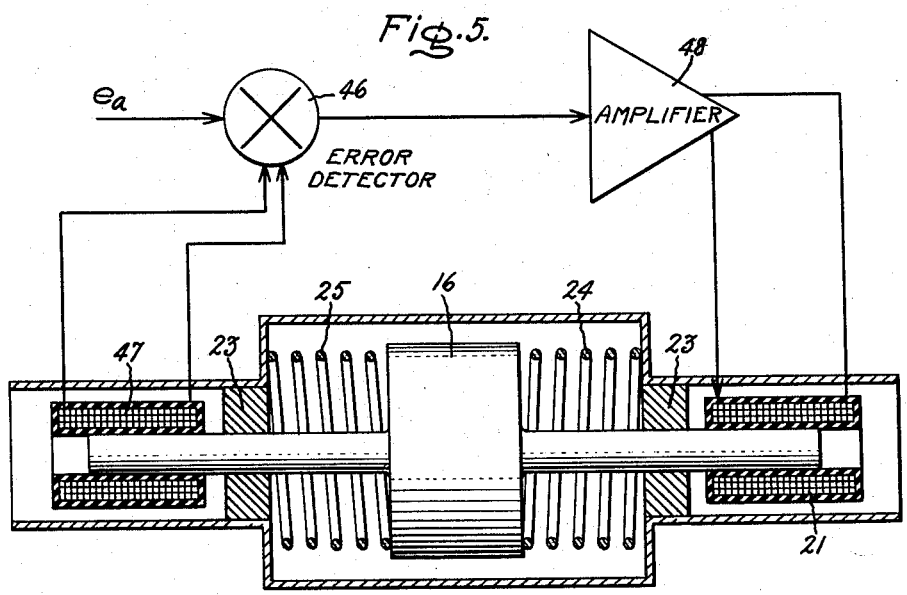
FIGURE 5 is a schematic representation of a weight drive means for one embodiment of the invention.

In the embodiment shown in FIGURE 2, a solenoid means or electromagnetic coil is provided to cause the reciprocating movement of the respective weights. However, as pointed out above and as discussed more fully hereinafter, other means, such as hydraulic or pneumatic drive means, could be employed to cause the reciprocating movement. In the embodiment shown in FIGURE 2, the signal $e_a$ is received by a solenoid control 42. FIGURE 5 represents a particular circuit which may be employed as the solenoid control 42, and also indicates the electrical connections of the solenoid control to the solenoid 43. The signal $e_a$ which is received by the solenoid control 42 from the attenuator 40 is directed to an error detector 46 which modifies the signal in response to a position feedback signal generated by sensing coil 47 which is positioned in the solenoid 43. The signal, thus modified, is transmitted to an amplifier 48 which transmits a drive signal to the drive coil 21 in response to the signal received from the error detector 46.

A reciprocating motion of the weight 16 is thus set up in response to the manual adjustments of the synchro receiver 32 and the attenuator 40 to develop a reciprocating force to neutralize the unbalance force generated by the rotating shaft 15.

Referring again to FIGURE 2 of the drawings, the means to drive the reciprocating weight 17 are essentially identical to the means just described for imparting a reciprocating motion to weight 16. The second resolver 37 generates a voltage signal in response to the position of shaft 35 which may be expressed as follows:

$$e_r = -\cos(wt + \psi - \alpha)$$

This signal is transmitted to an attenuator 50 which has a manually adjustable magnitude control 51 similar to the control 41 of attenuator 40. The attenuator 50 modifies the signal generated by resolver 37 so that the signal leaving the attenuator 50 becomes representative of the distance that the second weight 17 must travel to generate the appropriate neutralizing force. This signal may be expressed as follows:

$$e_a = \frac{-M}{m_2 \sin 2\alpha} \cos(wt + \psi - \alpha)$$

This signal is transmitted to a solenoid control 52 which has an identical construction to that shown in FIGURE 5 for solenoid control 42. The solenoid control 52 transmits a drive signal to the solenoid 53 which sets up a reciprocating motion of weight 17 and contemporaneously transmits a feedback signal to the solenoid control 52 in a manner identical to that described for weight 16.

The angle $\alpha$ is preferably but not necessarily equal to 45°. Also, $m_1$ and $m_2$ are preferably equal. Then the two attenuators can be directly ganged together and operated by a single control. If $m_1$ and $m_2$ are unequal, the attenuators can be ganged together through a gear ratio $m_1/m_2$.

The invention, as thus far described, provides a practical and efficient means for neutralizing a single unbalance force generated by a rotating member as the unbalance force varies in magnitude and phase with time. However, as discussed earlier, a rotating machine quite often experiences a plurality of periodic forces occurring contemporaneously but having different frequencies. The following description discloses a modification of the present invention which provides a practical and efficient means for neutralizing such a plurality of periodic forces.

Figure 3:
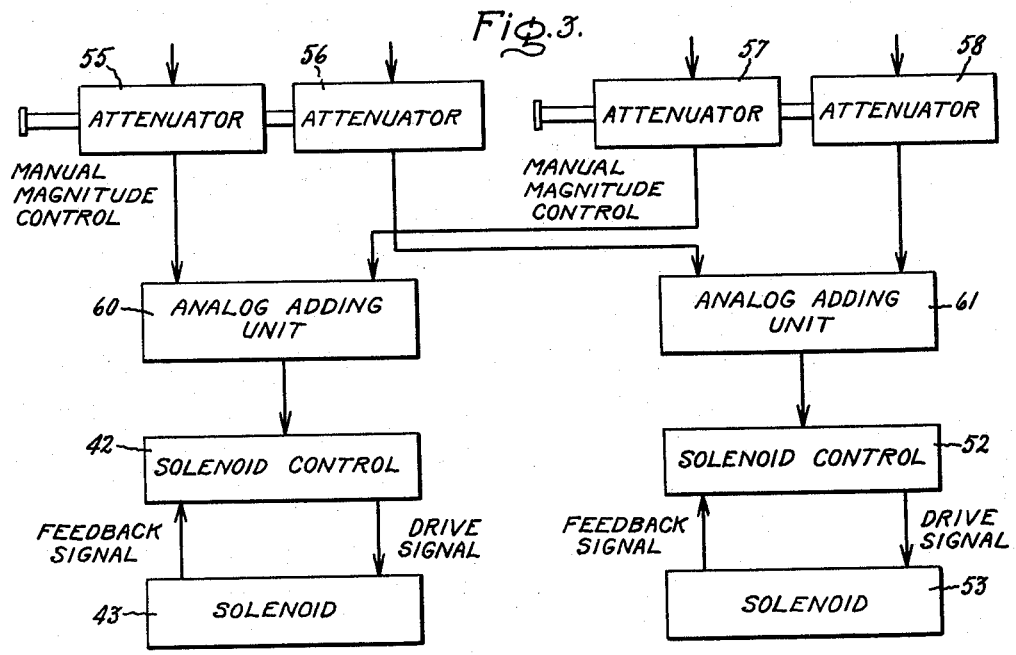
FIGURE 3 is a partial block diagram similar to FIGURE 2 but illustrating an embodiment of the invention for neutralizing a plurality of periodic forces having different frequencies.

Referring now to FIGURE 3, there is illustrated a block diagram representing a control means to achieve neutralization of a plurality of periodic forces of different frequencies. The entire control arrangement is not shown for the purposes of this discussion. However, the control arrangement above the attenuators shown in FIGURE 3 is identical with that shown in FIGURE 2 with the exception that each component shown in FIGURE 2 above the attenuators must be duplicated for each frequency of periodic force to be neutralized. That is, the arrangement in FIGURE 3, which is designed to provide neutralization for two periodic forces of different frequencies, would comprise two synchro transmitters such as 30 in FIGURE 2, two synchro receivers such as 32 with each receiving a signal from its respective transmitter, two resolvers such as 36 and 37 mechanically linked to the first of the two synchro receivers, and a second pair of resolvers mechanically linked to the second of the synchro receivers. The first pair of resolvers transmits signals to the attenuators 55 and 56 in FIGURE 3, and the second pair of resolvers transmits signals to attenuators 57 and 58.

Each of the attenuators 55, 56, 57 and 58 modifies in amplitude the respective signal received and transmits the signal thus modified in a manner similar to the arrangement discussed above for the neutralization of a single unbalance force. The attenuators 55 and 56, respectively, transmit signals which eventually modify the reciprocating movements of the weights 16 and 17, respectively, so as to neutralize a first periodic force of a given frequency. The attenuators 57 and 58, respectively, transmit signals which eventually modify the reciprocating movements of the weights 16 and 17, respectively, to neutralize a second periodic force of a frequency different from that of the first periodic force.

An analog adding unit 60 is provided to receive the signal transmitted by attenuator 55 and the signal transmitted by attenuator 57. The analog adding unit 60 transmits a signal in response to the signals received from attenuators 55 and 57, which represents an algebraic summation of the two signals to thereby provide linear addition of the signals. The signal thus transmitted by the analog adding unit 60 is received by the solenoid control 42 and is thereby utilized in a manner similar to that described above for the neutralization of a single unbalance force.

The attenuators 56 and 58 transmit respective signals to an analog adding unit 61 which algebraically adds the signals in a manner similar to that of analog adding unit 60 to thereby provide a signal transmitted to solenoid control 52 to control the reciprocating movement of the second weight 17 in a manner similar to that described above for the neutralization of a single unbalance force.

The analog adding units 60 and 61 may be of a design as disclosed in Korn and Korn, Electronic Analog Computers, McGraw-Hill, 1952, pages 12–14. Alternatively, each adding unit may be combined with an error detector 46 (FIGURE 5) in a single unit.

Figure 6:
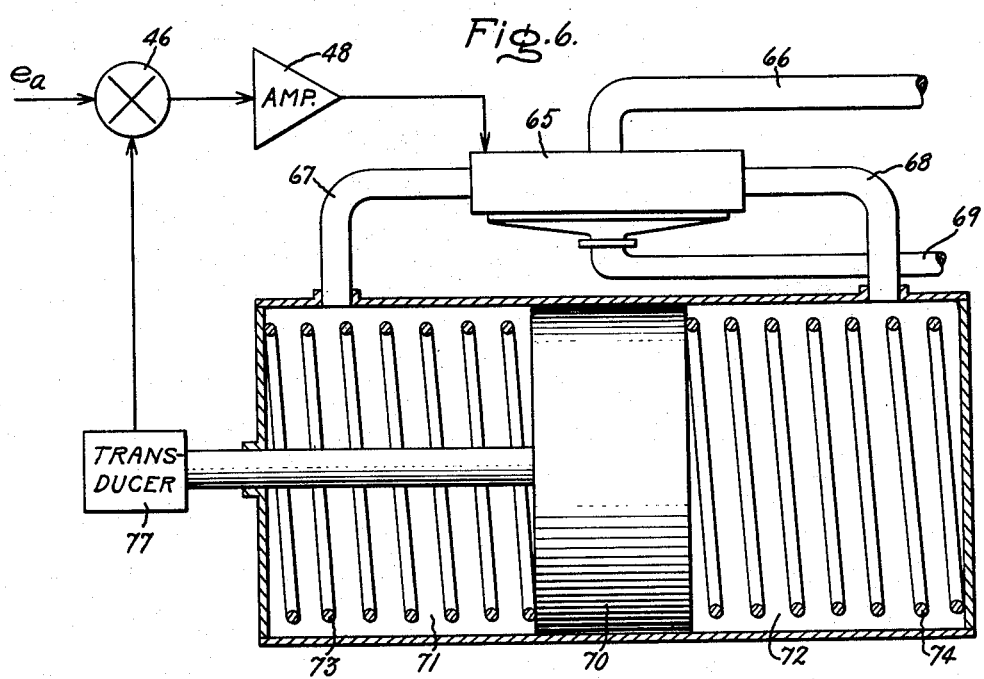
FIGURE 6 is a schematic representation of a weight drive means for a second embodiment of the invention.

The invention as thus far described has been directed toward one embodiment of the invention wherein an electric means, such as a solenoid, is employed to drive the reciprocating weights 16 and 17. FIGURE 6 illustrates a further embodiment of the present invention wherein a hydraulic or pneumatic means may be employed to drive the reciprocating weights. Referring now to FIGURE 6, a voltage signal $e_a$ is received by an error detector 46 from an attenuator such as 40 discussed above, and the error detector 46 and the amplifier 48 function identically to those described above for the embodiment shown in FIGURE 5. The signal transmitted by the amplifier 48 is received by a solenoid valve 65 which operates in response to the signal thus received. The solenoid valve 65 has a pressure inlet 66 which communicates with either a hydraulic or a pneumatic pressure source (not shown). The solenoid valve 65 is a two-way valve; i.e., it directs the pressure received from the inlet 66 to either of two outlets 67 or 68, depending upon the signal received from the amplifier 48, and connects the other outlet to the discharge 69. When the signal from the amplifier 48 is such that the solenoid valve 65 directs the pressure to outlet 67, a piston 70, which serves as the reciprocating mass or weight, is forced to the right as shown in FIGURE 6, due to the pressure in chamber 71. If the signal received from amplifier 48 is such that the solenoid valve 65 directs the pressure through outlet 68, the piston 70 is forced to the left as shown in FIGURE 6 due to the pressure in chamber 72. Return springs 73 and 74 are provided to return the piston 70 to the rest position, as shown in FIGURE 6, when the system is deenergized. It should be obvious from the immediately preceding discussion that a reciprocating movement of piston 70 can be set up by introducing the proper signal to the solenoid valve 65.

A transducer 77, which may be a linear potentiometer, transmits a feedback signal to the error detector 46 in response to the position of piston 70. The error detector 46 modifies the signal transmitted to amplifier 48 in response to the signal received from the transducer 77.

Another aspect of the invention is that the construction may be further utilized to ascertain continuously the magnitude and direction of periodic forces in a machine. By utilization of suitable computing procedures and means, the periodic forces as sensed may be translated into corrective forces and applied to the shaft in such a manner that the shaft is balanced for varying operating conditions.

As will be evidenced from the foregoing description, certain aspects of the invention are not limited to the particular details of the construction of the example illustrated, and it is contemplated that various and other modifications or applications will occur to those skilled in the art. It is, therefore, intended that the appended claims shall cover such modifications and applications as do not depart from the true spirit and scope of the invention.

What is claimed as new and desired to be secured by Letters Patent of the United States is:

1. Apparatus for neutralizing the vibration generated by a rotating shaft comprising:
   (a) a bearing pedestal for said shaft,
   (b) first and second weights mounted on said pedestal for reciprocating movement relative thereto and at an angle with respect to each other.
   (c) first and second drive means for said first and second weights respectively,
   (d) a synchro transmitter mechanically linked to said shaft and adapted to generate a signal in response to the rotation of said shaft,
   (e) a synchro receiver connected to said synchro transmitter to rotate a second shaft in response to the signal generated by said synchro transmitter,
   (f) first and second resolvers mechanically linked to said second shaft to generate first and second voltage signals respectively in response to the rotation of said second shaft,
   (g) a first attenuator adapted to modify the amplitude of said first voltage signal generated by said first resolver,
   (h) a first drive means control for controlling the operation of said first drive means in response to the first voltage signal generated by said first resolver as modified by said first attenuator,
   (i) a second attenuator adapted to modify the amplitude of said second voltage signal generated by said second resolver, and
   (j) a second drive means control for controlling the operation of said second drive means in response to the second voltage signal generated by said second resolver as modified by said second attenuator.

2. The invention defined by claim 1 wherein said synchro receiver includes a manually adjustable phase control to rotate said second shaft at a phase angle relative to said signal generated by said synchro transmitter.

3. The invention defined by claim 1 wherein said first and second attenuators include manually adjustable magnitude controls to vary the amplitude of the signals generated by said first and second resolvers respectively to thereby directly vary the magnitude of reciprocation of said first and second weights respectively.

4. Apparatus for neutralizing the vibration generated by a rotating shaft comprising:
   (a) a bearing pedestal for said shaft,
   (b) first and second cylinders mounted on said pedestal,
   (c) a piston positioned within each of said first and second cylinders for reciprocating movement relative thereto and at an angle with respect to each other,
   (d) a synchro transmitter mechanically linked to said shaft and adapted to generate a signal in response to the rotation of said shaft,
   (e) a synchro receiver connected to said synchro transmitter to rotate a second shaft in response to the signal generated by said synchro transmitter,
   (f) first and second resolvers mechanically linked to said second shaft to generate first and second voltage signals respectively in response to the rotation of said second shaft,
   (g) a first attenuator adapted to modify the amplitude of said first voltage signal generated by said first resolver,
   (h) a first solenoid valve means for controlling the admission of fluid pressure to said first cylinder in response to the first voltage signal generated by said first resolver as modified by said first attenuator,
   (i) a second attenuator adapted to modify the amplitude of said second voltage signal generated by said second resolver, and
   (j) a second solenoid valve means for controlling the admission of fluid pressure to said second cylinder in response to the second voltage signal generated by said second resolver as modified by said second attenuator.

5. The invention of claim 1 in which means are provided for continuously indicating the amount of said resultant force.

References Cited by the Examiner
UNITED STATES PATENTS

| | | | |
|---|---|---|---|
| 2,226,571 | 12/40 | McGoldrick | 188—1 |
| 2,361,071 | 10/44 | Vang | 188—1 |
| 2,964,272 | 12/60 | Olson | 248—19 |

CLAUDE A. LE ROY, *Primary Examiner.*